July 16, 1968
J. R. DIVER
3,392,742
HYDRAULIC DROOP CONTROLLER WITH AUTOMATIC RESET
Filed March 28, 1966
3 Sheets-Sheet 3
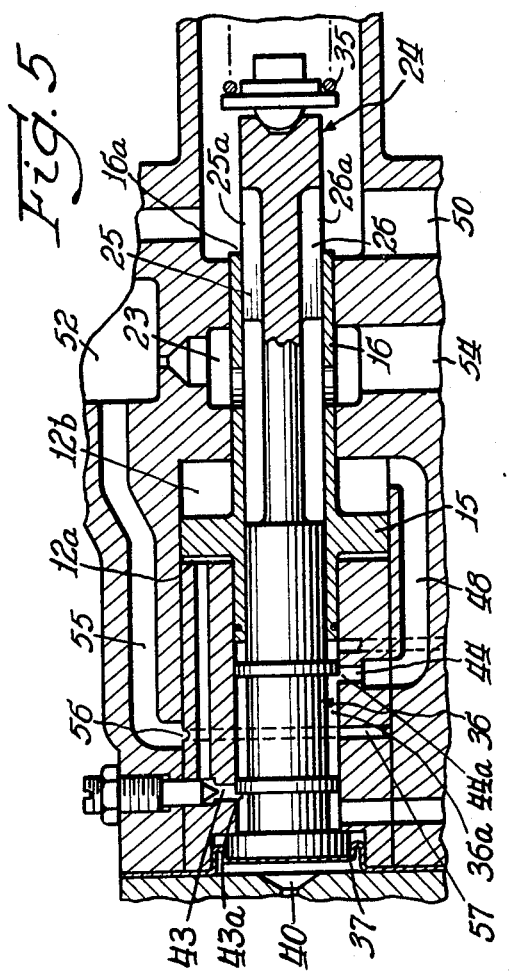
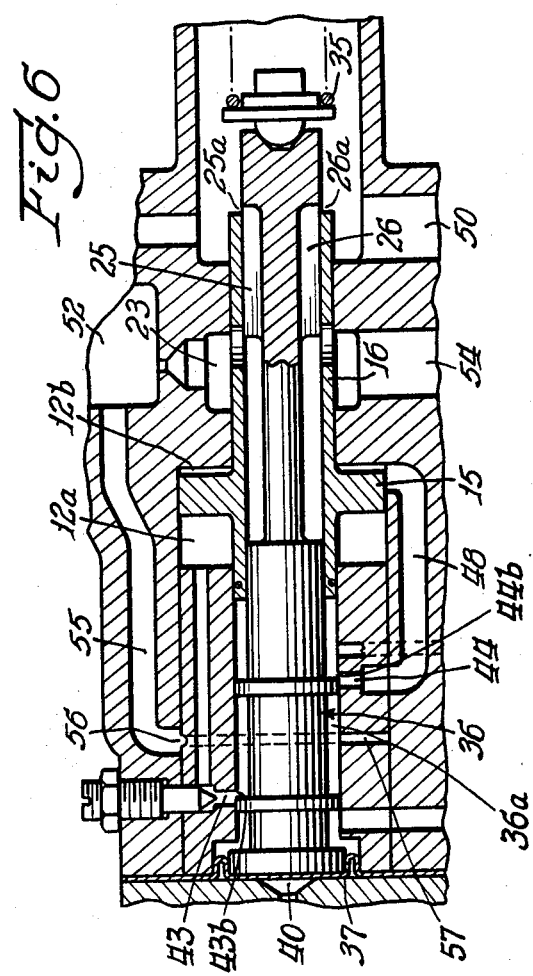
Inventor:
John R. Diver
By: F. A. Kennedy Atty.

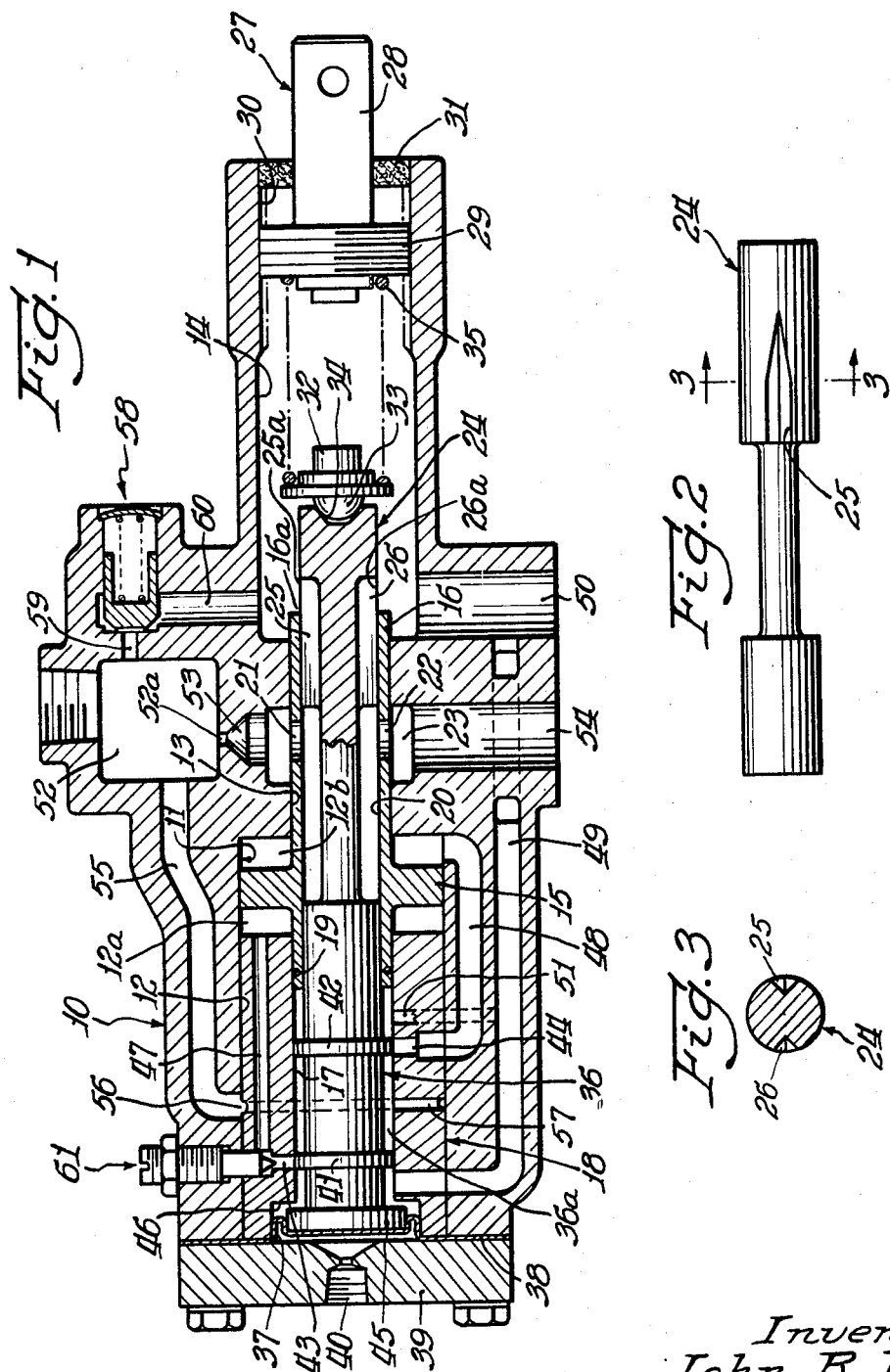

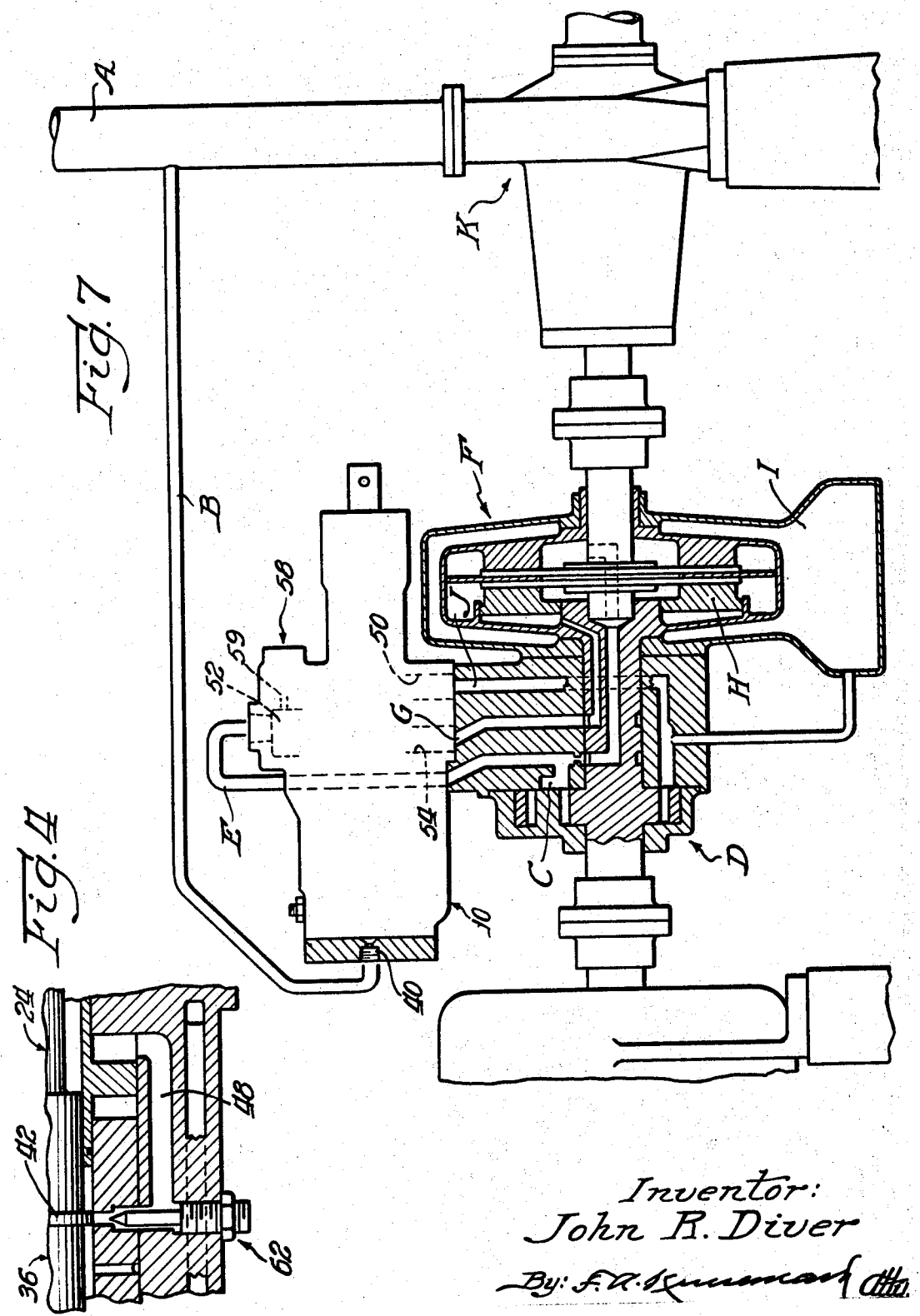

United States Patent Office 3,392,742
Patented July 16, 1968

3,392,742
HYDRAULIC DROOP CONTROLLER WITH
AUTOMATIC RESET
John R. Diver, Lake Forest, Ill., assignor to Borg-Warner
Corporation, Chicago, Ill., a corporation of Illinois
Filed Mar. 28, 1966, Ser. No. 538,082
5 Claims. (Cl. 137—82)

The present invention relates to a hydraulic droop controller and more particularly to a controller for automatically maintaining a controlled quantity at a fixed reference value.

While the present invention will be described particularly with reference to a hydraulic system for the supply of water at a predetermined pressure, it will be understood that the invention is not limited thereto but is applicable in the controlling of other variables such as speed, temperature and horsepower to name but a few.

A controller according to the present invention is an apparatus which measures the value of a variable controlled quantity, and operates to correct errors of this controlled quantity from a predetermined reference value, technically termed the set-point. When the controlled quantity is above set-point it is termed as being in plus error and when it is below set-point it is termed to be in minus error which are corrected by reverse action to set-point value.

Controllers call for the use of "motor operators," which in hydraulic systems, activate means to regulate the output of the systems' fluid pumps which serve to maintain the fluid pressures in the hydraulic system within permissible error at predetermined values.

Droop controllers with automatic reset, shown in the prior art, Woodward Patent No. 2,478,753, for example, call for droop producing means, reset producing means and the reverse action means which are operably associated and remotely situated with respect to a main metering spool. This remoteness inherently delays response which adversely affects controller accuracy, over-shoot and settling-out time.

In the present invention the droop producing means, the reset producing means and the reverse action means, all comprise the same interacting components, which are operably associated with and proximate to the main metering spool, and the relative movements of which determine the capacity in which they are functioning at a given instant. Therefore response inherently is faster which provides better accuracy, faster settling-out time and lower over-shoot under transient change than in currently available controllers.

When used as a control with respect to a slipping clutch, variable speed drives which exhibit substantial lags and dead time; a first derivative responsive control means, only, is provided which initially corrects the major portion of transient error and comprises the same interacting components which make up the droop, reset and reverse action means whereby results are obtained substantially comparable to the Woodward controller, Patent No. 3,163,813, in which successive derivative responsive control means are used which makes it more complicated than the present invention.

Also the unique combination of elements in the present invention as heretofore shown, accomplishes results equivalent to that obtained in the combination of elements in the above reference, one of which elements is defined as an "absquarer" and this is accomplished with a structure that is less complicated and lower in cost.

It is therefore an important object of the present invention to provide an improved hydraulic droop controller wherein the droop producing means, reset producing means, derivative responsive means and, equivalent "absquare" functional means (see Patent No. 3,163,813) are incorporated in one and the same mechanism with the reverse action means.

It is another important object of the present invention to provide an improved hydraulic droop controller wherein the droop producing means and the reset producing means are directly responsive to the controller input.

It is still another important object of the present invention to provide an improved, dependable, simple and low-cost hydraulic droop controller which responds faster to transient change, whereby accuracy and regulation are improved.

The invention consists of the novel construction, arrangements and devices to be hereinafter described and claimed for carrying out the above stated objects and such other objects as will be apparent from the following description of preferred forms of the invention, illustrated with reference to the accompanying drawings, wherein:

FIGURE 1 is a diagrammatic view of a hydraulic controller according to the present invention; showing the selector spool hydraulically centered;

FIGURE 2 is a view of the metering spool shown in FIGURE 1 but in a ninety degree rotated position;

FIGURE 3 is a cross section taken on line 3—3, FIGURE 2;

FIGURE 4 is a fragmentary view showing a modification of the hydraulic pressure controller shown in FIGURE 1, the modification consisting of the addition of an adjustable needle valve;

FIGURE 5 is a fragmentary view of FIGURE 1 showing the selector spool in a position, tending to decrease controlled pressure output;

FIGURE 6 is a fragmentary view of FIGURE 1, showing the selector spool in a position, tending to increase controlled pressure output; and FIGURE 7 shows a view, partially in outline and reduced in size, of the controller shown in FIGURE 1 including a hydraulic pressure sensing means, connected to a hydraulic system.

Referring now to the accompanying drawings which illustrated a preferred embodiment shown diagrammatically in FIGURE 1, which comprises a casing 10 having a compound cylindrical bore 11 therethrough, comprising a relatively large bore 12, a relatively small bore 13 and an intermediate bore 14. The relatively large bore 12 provides a pair of annular chambers 12a and 12b on opposite sides of a reset piston 15 which is a component of a reset sleeve 16 having a metering edge 16a reciprocally operable within the relatively small bore 13 and a cylindrical bore 17 within a selector valve sleeve 18 which is leak proof fixed within the relatively large bore 12. Functionally the selector valve sleeve 18 is an integral part of the casing 10. The reset sleeve 16 has a seal 19 in sealing engagement with the cylindrical bore 17 and is provided with a cylindrical bore 20 therethrough having ports 21 and 22 in communication with an annular cavity 23 in the casing 10.

A metering spool 24, operable in the cylindrical bore 20, is provided at one end thereof with a pair of metering notches 25 and 26 associated with the metering edge 16a serving as variable orifices in communication between the intermediate bore 14 and the cylindrical bore 20. This combination of components serve as the droop producing means and the reverse action means, hereinafter more fully explained.

An adjusting means 27 is provided which comprises a shaft 28 having an enlarged threaded end 29 in matching engagement with a threaded inner-periphery 30 of the intermediate bore 14. Fluid sealing means 31 is provided between the shaft 28 and the inner-periphery of the outer end of the intermediate bore 14. A part 32 has a semispherical protuberance 33, which is in engagement with a tapered recess 34 on the end of the metering spool 24. A compression spring 35, is interposed between the enlarged threaded end 29 and the part 32.

A selector spool 36 operable within the cylindrical bore 17 is interposed between the metering spool 24 and a sealing gland 37 which is clamped between the left face 38 of the casing 10 by a cap 39 which is provided with a port 40 in communication with that portion of the cylindrical bore 17 which is between the sealing gland 37 and the innerface of the cap 39. The selector spool 36 has lands 41 and 42 which provides a pressure annulus 36a therebetween and is operably associated with ports 43 and 44, respectively. The selector spool 36 is also provided with a flange 45 engageable with a shoulder 46 on the selector valve sleeve 18 for limiting the forward movement of the selector spool 36.

The selector spool 36, reset sleeve 16 and the metering spool 24 including the bore in which they operate, serve as the reset producing means hereinafter more fully explained.

The metering spool 24, may be combined as a unit with the selector spool 36. The reason for providing separate units in the present inventions is based on machine shop practice.

A fluid passage 47 interconnects the port 43 with the annular chamber 12a and a fluid passage 48 interconnects the port 44 with the annular chamber 12b.

A drain conduit 49 interconnects the left end area of the cylindrical bore 17 with a drain conduit 50 which is in fluid communication with the intermediate bore 14, and a fluid passage 51 interconnects the right end area of the cylindrical bore 17 with the oil drain passage 49.

A pressure cavity 52 is provided with a fixed orifice 52a in communication with a fluid passage 53 which is connected to an annular cavity 23 provided with a bore 54, serving to transmit the controller output pressure to actuate a motor operator which may be, for instance, either an actuator diaphragm of a two-poppet balanced pressure control valve, or an actuator piston associated with a variable speed drive for a fluid pump, in a hydraulic system.

A fluid passage 55 is connected at one end thereof to the pressure cavity 52 and at the other end to an annular groove 56 in the outer perimeter of the selector valve sleeve 18. A fluid passage 57 interconnects the annular groove 56 with the pressure annulus 36a at its intermediate area.

A regulating relief valve 58 is in fluid communication with the pressure cavity 52 by a fluid passage 59 and in fluid communication with the intermediate bore 14 by a drain conduit 60, whereby the supply pressure to the controller may be limited to a substantially constant predetermined value.

An adjustable needle valve 61 is provided as a means for adjusting the flow restriction in fluid passage 47 to regulate response time characteristics of the controller.

In FIGURE 4, an adjustable metering valve 62 is provided as a means for adjusting the flow restriction in fluid passage 48 in the event that this modified form of the present invention would be desirable to increase the response time characteristics of the controller.

When a hydraulic droop controller according to the present invention is used in a hydraulic system wherein fluid such as water is the product of delivery at a predetermined level of pressure, the controller shown in FIGURE 1 is connected to the hydraulic system, FIGURE 7, as follows: the port 40 is connected to the fluid (water in this instance) delivery line A in the hydraulic system by a conduit B, generally termed a signal transmitting means, at a point at which it is desired to pick up a pressure signal; the pressure cavity 52 is connected to the discharge side C of an oil pump D by a conduit E whereby oil is delivered to the pressure cavity 52 wherein this pressure is maintained at a substantially constant level by the regulating relief valve 58 connected thereto by a fluid passage 59; the bore 54 is connected with respect to a slipping clutch F by a conduit G in fluid communication with a piston H, a component of the slipping clutch F, and technically termed a motor operator; and the drain conduit 50 is connected to a sump I by conduit means J.

The slipping clutch F forms the modus operandi whereby controller output, in corrective response to a measured pressure error, is translated into that fluid delivery change in the hydraulic system necessary to compensate for the pressure error, measured.

In operation, when the system is functioning such that the fluid delivered (water in this instance) is at set-point value, the regulatory components are in an equilibrium position as shown in FIGURE 1, and the water pressure in port 40 also is at set-point value.

When the predetermined level of pressure is above set-point, it is in plus error, which is a pressure increase that is transmitted through the port 40 against the sealing gland 37, causing the selector spool 36 and the structurally contiguous metering spool 24 to move the metering notches 25 and 26 relative to metering edge 16a in a direction as shown in FIGURE 5 thereby increasing the areas of variable metering orifices 25a and 26a at an increasing rate as the fluid pressure increases. Increasing the areas of the variable orifices decreases the oil pressure in the annular cavity 23 which lowers the control output oil pressure in bore 54, thereby reducing the oil pressure to the piston H (motor operator) which in turn increases the slippage of the clutch F which causes a reduction in the speed of the hydraulic system's centrifugal pump K resulting in a corresponding reduction of fluid pressure at port 40.

The reset sleeve 16 remains substantially inert in the first instant, however, the movement of the selector spool 36 opens ports 43 and 44 whereby the fluid pressure in the pressure cavity 52 is transmitted to the annular chamber 12b by way of fluid passage 55, annular groove 56, fluid passage 57, pressure annulus 36a, port opening 44a and oil fluid passage 48 whereby the reset piston 15 moves the reset sleeve 16 to further increase the areas of the variable metering orifices 25a and 26a. When the buildup of resistance by the compression spring 35 matches that of the fluid pressure at port 40 there is no further movement of the selector spool 36 and therefore no further increase in the areas of the variable metering orifices 25a and 26a from this source, and any increase in these areas from thereon, is due to the movement of the reset sleeve 16 as shown above.

When the corrective action reduces the pressure in port 40 to set-point value the metering spool 34 and the contiguous selector spool 36 together with the other regulatory components return to their equilibrium position under the influence of the compression spring 35 as shown in FIGURE 1.

In the interest of saving time and space, a detailed description of a sequence of events with respect to the correction of a minus error are not given because they are the same as those given with respect to a pulse error except in reverse thereof; broadly shown in FIGURE 6.

I claim:
1. A hydraulic droop controller for maintaining a controlled quantity of a system having a hydraulic oil pump, at a highly accurate predetermined level, comprising in combination.
  (A) A casing provided with a relatively large bore, a relatively small bore, an intermediate bore, and a first cylindrical bore in alignment with said relatively small bore,
  (B) a reset sleeve having a second cylindrical bore therein and operable in said relatively small bore an said first cylindrical bore, said reset sleeve provided with a piston operable in said relatively large bore whereby first and second annular chambers are provided, one each on opposite sides thereof, (C) a selector spool and a continuous metering spool operable within said first cylindrical bore and said second cylindrical bore and interposed between a sealing gland and a compression spring mounted in said intermediate bore, said compression spring being interposed between a part in contact with the extremity of said metering spool and adjusting means whereby said selector spool is urged against said sealing gland,
  (1) at least one variable metering notch in said metering spool operably associated with one end of said reset sleeve, thereby providing at least one variable metering orifice communicable between said intermediate bore and said second cylindrical bore,
  (2) a first and second land on said selector spool within said first cylindrical bore, (D) a pressure cavity in said casing, connectable to a fluid supply means and provided with a fixed orifice in fluid communication with a fluid passage, which is in communication with an annular cavity within said relatively small bore,
  (1) a bore in said casing in fluid communication with said annular cavity, said bore being connected with respect to the discharge side of said oil supply means,
  (2) at least one port in said reset sleeve whereby fluid communication is established between said pressure cavity and said intermediate bore,
  (3) a regulating relief valve interconnected between said pressure cavity and said intermediate bore by a first fluid passage means,
  (4) a drain conduit interconnecting said intermediat bore and a sump, (E) a second fluid passage means interconnecting said pressure cavity and a pressure annulus provided in said first cylindrical bore between said first and second lands,
  (1) a third fluid passage means, connectable between said pressure annulus and said second annular chamber,
  (2) a forth fluid passage means interconnectable between said pressure annulus and said first annular chamber, (F) a drain passage interconnecting said drain conduit and the left end area of first cylindrical bore, and (G) a signal transmitting means interconnecting with respect to said selector spool and a controlled quantity in said system.

2. A hydraulic droop controller as defined in claim 1 wherein the said signal transmitting means comprises a fluid transmitting conduit.

3. A hydraulic droop controller as defined in claim 1 wherein an adjusting means comprises a shaft having an enlarged threaded end, threaded into said second bore in engagement with said compression spring.

4. A hydraulic droop controller as defined in claim 1 wherein an adjustable needle valve mounted in said casing is in adjustable communication with said third fluid passage means.

5. A hydraulic droop controller for maintaining a controlled quantity of a system having a hydraulic oil pump, at a highly accurate predetermined level, comprising in combination:

(A) A casing provided with a relatively large bore, a relatively small bore, an intermediate bore, in fluid communication with a sump, a first cylindrical bore in alignment with said relatively small bore, and a pressure cavity in communication with a source of fluid delivery, (B) a reset sleeve having a second cylindrical bore therein and operable in said relatively small bore and said first cylindrical bore, said reset sleeve being provided with a position operable in said relatively large bore thereby defining first and second annular chambers, one each on opposite sides of said piston, (C) a spool means positioned between first and second biasing means is provided with first and second lands at one end thereof, slidably operable in said first cylindrical bore, thereby defining an annulus therebetween, and is provided at the other end thereof with at least one variable metering notch operably associated at one end of said reset sleeve, thereby providing at least one variable metering orifice communicable with said intermediate bore and said second cylindrical bore in said sleeve, (D) an annular cavity within said relatively small bore in fluid communication with said pressure cavity and a motor operator, (E) fluid pasage means providing intercommunication between the said pressure cavity and the said annulus, the said first annular chamber, the said second annular chamber, and the said second cylindrical bore which is in fluid communication with the said annular cavity.

References Cited

UNITED STATES PATENTS

| | | | |
|---|---|---|---|
| 2,484,888 | 10/1949 | Hollerith | 137—625.66 X |
| 2,507,945 | 5/1950 | Teague | 137—85 X |
| 2,639,721 | 5/1953 | Strief | 137—85 |
| 2,767,725 | 10/1956 | Long | 137—86 |
| 3,114,378 | 12/1963 | Lockman | 137—86 |

ALAN COHAN, *Primary Examiner.*

UNITED STATES PATENT OFFICE
CERTIFICATE OF CORRECTION

Patent No. 3,392,742　　　　　　　　　　　　　　　July 16, 1968

John R. Diver

It is certified that error appears in the above identified patent and that said Letters Patent are hereby corrected as shown below:

Column 4, line 74, "an" should read -- and --. Column 5, line 35, "mediat" should read -- mediate --. Column 6, line 22, "position" should read -- piston --.

Signed and sealed this 9th day of December 1969.

(SEAL)
Attest:

Edward M. Fletcher, Jr.　　　　　　　　　　　WILLIAM E. SCHUYLER, JR.
Attesting Officer　　　　　　　　　　　　　　　　Commissioner of Patents